Sept. 18, 1962   G. R. DONALDSON ETAL   3,054,833
HYDROGENATION OF AROMATIC HYDROCARBONS
Filed Jan. 25, 1960
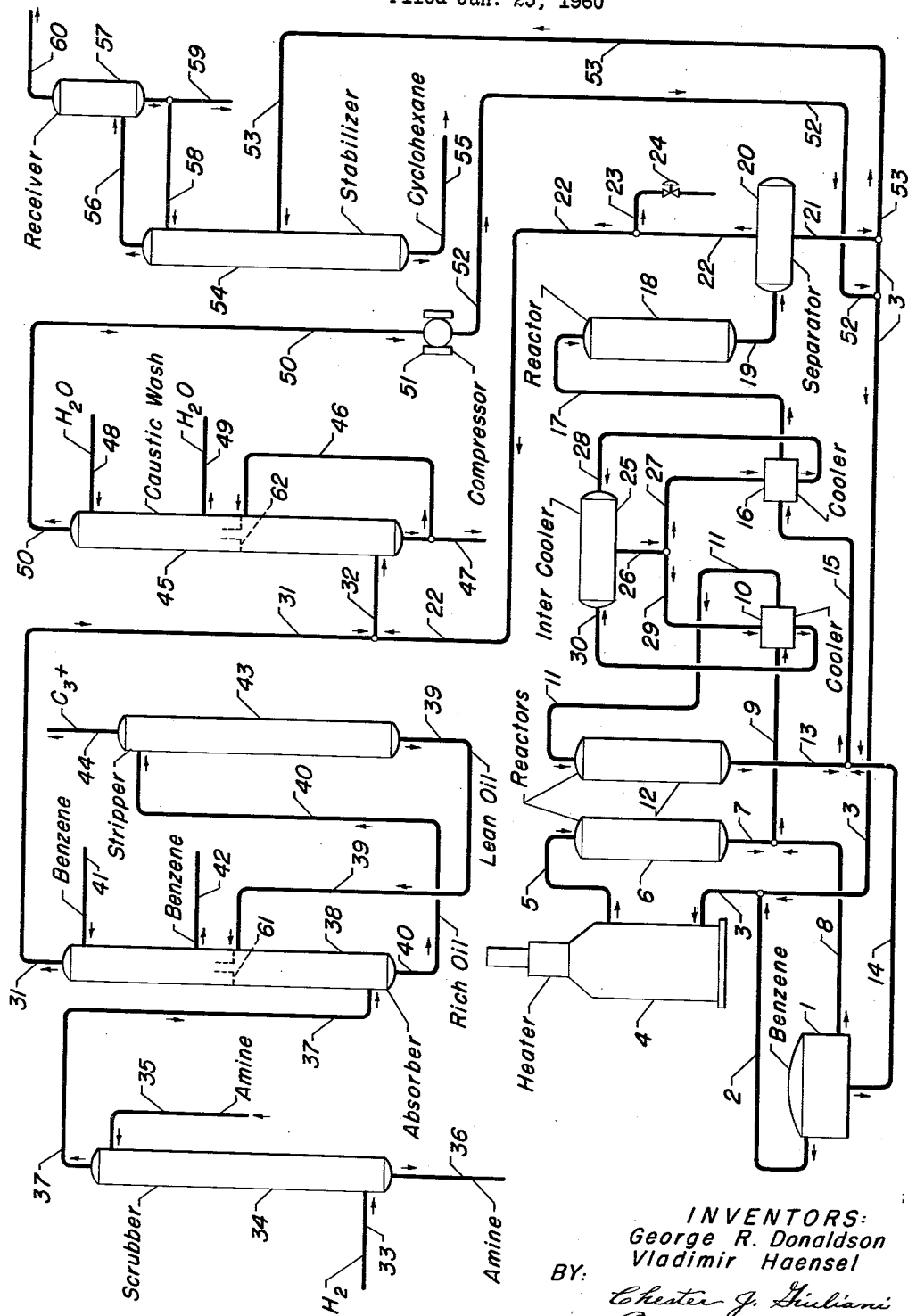
INVENTORS:
George R. Donaldson
Vladimir Haensel
BY: Chester J. Giuliani
Philip T. Liggett
ATTORNEYS "United States Patent Office"
3,054,833
Patented Sept. 18, 1962

3,054,833
HYDROGENATION OF AROMATIC
HYDROCARBONS
George R. Donaldson, Barrington, and Vladimir Haensel, Hinsdale, Ill., assignors to Universal Oil Products Company, Des Plaines, Ill., a corporation of Delaware
Filed Jan. 25, 1960, Ser. No. 4,548
16 Claims. (Cl. 260—667)

In its broad aspect, the present invention relates to the hydrogenation of aromatic hydrocarbons such as benzene, toluene, the various xylenes, naphthenes, etc., to form the corresponding cyclic paraffins. The present invention is particularly advantageous when utilized for processing aromatic hydrocarbons which are contaminated by sulfurous compounds, especially thiophenic compounds, and affords virtually 100% conversion without the necessity for the absolutely complete removal of these sulfur compounds from such aromatic hydrocarbons. More specifically, the present invention is directed toward a process for the hydrogenation of sulfur-contaminated benzene to form substantially pure cyclohexane, which process is effected through the utilization of a particular noble metal catalyst in a particular manner, and under certain conditions of operation.

The process of the present invention effects the hydrogenation, or saturation, of various aromatic hydrocarbons to form the cycloparaffinic counterpart thereof. In addition to those aromatic hydrocarbons mentioned above, the present invention affords advantages to the hydrogenation of substituted aromatic hydrocarbons such as ethylbenzene, diethylbenzene, and various mono-, di-, tri-substituted aromatic hydrocarbons, etc. The corresponding cyclic paraffins, resulting from the hydrogenation of the aromaitc nuclei, include compounds such as cyclohexane, mono-, di-, tri-substituted cyclohexane, Decalin (decahydronaphthalene), Tetralin (tetrahydronaphthalene), etc. These cycloparaffinic compounds are extensively employed in commercial industries for a wide variety of purposes: for example, cyclohexane is utilized in the manufacture of nylon, and as a solvent for various fats, oils, waxes, etc. Cyclohexane is often employed in the manufacture of crude rubber and various resins, and is utilized in paint and varnish remover. Mono-, di-, and tri-substituted cyclohexanes are highly desirable for utilization as jet fuel components, as well as for starting materials in various organic syntheses. Decalin is employed as an organic solvent for heavier fats and oils, as a stain remover, as a substitute for turpentine, etc. Tetralin is utilized as a solvent for various resinates, for asphaltic material, as an ingredient in shoe polish, etc. For the greater majority of uses, it is extremely desirable that the cycloparaffin, for example cyclohexane, exist in a substantially pure state, and particularly uncontaminated by the corresponding aromatic hydrocarbon.

In the interest of simplicity, the following discussion will be directed toward the hydrogenation of benzene to form substantially pure cyclohexane. It is understood that the method of the present invention may be utilized to advantage in hydrogenation processes regardless of the character of the aromatic hydrocarbon which is to be converted to the corresponding cyclic paraffin. Although cyclic paraffins exist in various petroleum hydrocarbon fractions and/or distillates, in substantial quantities, it is very difficult to effect recovery thereof by fractional distillation due to the tendency of the cyclic paraffins to form azeotropic mixtures. On the other hand, however, a series of distillations and extraction procedures may be utilized to obtain substantially pure aromatic hydrocarbons. For example, a benzene-containing material, such as a hydrocarbon naphtha boiling within the range of about 150° F. to about 400° F., may be subjected to fractional distillation, removing a heart cut which contains the benzene and other hydrocarbons boiling within the benzene boiling range. The benzene-containing heart cut is then subjected to an extraction process which separates the benzene from the normal or isoparaffins and naphthenes contained therein. The benzene is readily recovered from the particular solvent employed by way of distillation. In this manner, benzene, as well as other aromatic hydrocarbons, may be obtained having a purity as high as 99.0%.

The substantially pure aromatic hydrocarbon, for example benzene, may be hydrogenated to form the corresponding cyclic paraffin, such as cyclohexane. Heretofore, the hydrogenation has been at least partially effected by contacting the benzene, at hydrogenation conditions, with a nickel-containing catalytic composite. The utilization of nickel catalyst is disadvantageous in many respects, and especially from the standpoint that nickel is extremely sensitive to sulfurous compounds contained in the benzene being contacted therewith. Regardless of the source of benzene, the greater portion of the contaminants therein comprise sulfurous compounds, and particularly thiophene. As a result of the presence of these sulfurous compounds, hydrogen sulfide is formed via a side reaction with hydrogen, and the nickel catalyst becomes deactivated through an interreaction with the hydrogen sulfide, whereby the nickel component of the catalyst is converted to nickel sulfide. The thiophene reacts to form hydrogen sulfide and nickel sulfide at those catalyst location accessible to the thiophene molecule, and also to the benzene molecule. The resulting nickel sulfide is fixed in that location, and thus effectively blocks that particular action site from use in benzene hydrogenation. Sulfur which enters as hydrogen sulfide can have access to that part of the nickel not accessible to thiophene, in addition to those sites restricted to the benzene molecule. Thus, the capacity for sulfur depends upon the type (size) of the sulfur molecule entering the reaction zone. Some mercaptan-type sulfur compounds can break down in the preheater sections to yield hydrogen sulfide upon entering the reaction zone, functioning therein as hereinabove set forth.

The inter-reaction of the nickel-containing catalyst with hydrogen sulfide may be illustrated by the following chemical equation:

$$Ni + H_2S \rightleftharpoons NiS_x + H_2 \qquad (1)$$

As indicated, the reaction is at least partially reversible; however, even under the most conducive conditions, it is not reversible to the extent that a sufficient quantity of the nickel component of the catalyst becomes catalytically active for effecting additional hydrogenation. Nickel cannot, therefore, be considered a true catalyst; that is, a substance which promotes a reaction without being substantially affected thereby, and cannot, therefore, exhibit the extended capability of performing its intended function. In other words, the nickel catalyst, although fairly active initially, does not possess sufficient stability. The deactivation of the nickel catalyst is such that the process must be interrupted for the purpose of either regenerating the catalyst, or replacing the same; obviously, as a result of the rapid deactivation, this procedure does not lend itself to economical feasibility. An object of the present invention is to provide a catalyst which does not rapidly deactivate as a result of the sulfurous compounds in the benzene charge, and which, though reactable with such sulfurous compounds, reacts in a manner which is rather easily subject to reversibility. The catalyst of the present invention is a noble metal-containing catalytic composite, and, for example, when such noble metal constitutes platinum, the platinum reacts with the hydrogen sulfide resulting from the sulfurous compounds according to the following chemical equation:

$$Pt + H_2S \rightleftarrows PtS_x + H_2 \quad (2)$$

As indicated in Equation 2, the formation of platinum sulfide from platinum and hydrogen sulfide is readily reversible. The indicated reaction tends to reverse as the temperature of the reaction, whereby hydrogenation is effected, is increased. On the other hand, an increase in reaction temperature generally results in reactions other than the hydrogenation of the aromatic nuclei to the corresponding cyclic paraffin. For example, at elevated temperatures, benzene will be converted not only to cyclohexane, but also to methylcyclopentane and various straight-chain paraffinic hydrocarbons. Also, the conversion efficiency of benzene to cyclohexane tends to decrease with an increase in temperautre, and the purity of the cyclohexane product is lowered by the inclusion therein of unreacted benzene. Therefore, a further object of the present invention is to provide a process, at particular conditions of operation, which permits the utilization of elevated temperatures while processing a sulfur-contaminated aromatic hydrocarbon. The rate of reaction, or degree of reversibility, as illustrated by Equation 2, may be represented by the following mathematical expression:

$$\frac{PtS}{Pt} = K \frac{H_2S}{H_2} \quad (3)$$

where K is the reaction rate constant. Thus, it is seen that the removal of hydrogen sulfide from the system results in a decrease in the ratio of inactive platinum sulfide to platinum available for effecting the desired hydrogenation reaction. Through the utilization of the catalyst and process of the present invention, there is permitted the use of sulfur-contaminated benzene without the attendant catalytic deactivation. The utilization of the platinum-containing catalyst does not indicate a difference in the overall effect of the various sulfur compounds (thiophene as opposed to hydrogen sulfide) as was noted with the nickel-containing catalyst. The overall result is an extended period of operation, without the necessity for frequent shutdown to regenerate and/or change catalyst, while maintaining constant production of substantially completely pure cyclohexane.

Thus, in its broad aspect, the present invention is directed toward a process for hydrogenating aromatic hydrocarbons which comprises contacting said aromatic hydrocarbons, at hydrogenation conditions and in the presence of hydrogen, with a noble metal catalytic composite containing a refractory inorganic oxide and an alkali metal component.

This catalyst is further characterized by the fact that the noble metal, preferably platinum and/or palladium, constitutes from about 0.1% to about 2.0% by weight of the total composite, calculated as the element thereof. As hereinafter set forth in greater detail, the catalyst is effectively made selective for hydrogenation through the addition of an alkali, or alkaline-earth metal component in an amount less than the noble metal, and within the range of about 0.01% to about 0.7% by weight, also calculated as the element thereof. The remainder of the composite is the refractory inorganic oxide carrier material, preferably an alumina-containing refractory oxide, and alumina containing not substantially in excess of about 3.0% silica appears to be somewhat more beneficial in regard to stability, without experiencing the usual hydrocracking tendencies generally considered inherent in an alumina-silica base material. The detailed description of the carrier material is hereinafter set forth.

In one embodiment, the present invention relates to a process for hydrogenating aromatic hydrocarbons containing sulfurous compounds, which process comprises contacting said aromatic hydrocarbons with hydrogen in a plurality of reaction zones having disposed therein an alumina-platinum catalytic composite containing from about 0.01% to about 0.7% by weight of at least one metal from the group of alkali and alkaline-earth metals, and maintained under an imposed pressure within the range of from about 100 to about 2000 pounds per square inch, the inlet temperature to each of said reaction zones being about 200° F. to about 800° F., removing a hydrogenated liquid product from the last reaction zone in said plurality and recycling at least a portion of said hydrogenated liquid product to the first reaction zone in said plurality.

In another embodiment, the present invention provides a process for the production of cyclohexane from benzene containing sulfurous compounds in an amount of about 0.1 p.p.m. to about 3.0 p.p.m., calculated as elemental sulfur, which comprises contacting cyclohexane and benzene, in the presence of water-saturated hydrogen, in a plurality of reaction zones having disposed therein an alumina-platinum catalytic composite containing from about 0.01% to about 0.7% by weight of lithium and maintained under an imposed pressure within the range of from about 300 to about 1000 pounds per square inch, the inlet temperature to each of said reaction zones being about 200° F. to about 600° F., removing cyclohexane, substantially free from benzene, from the last reaction zone in said plurality and recycling at least a portion of said cyclohexane to the first reaction zone in said plurality.

A more specific embodiment of our invention involves a process for producing substantially pure cyclohexane from benzene which comprises contacting cyclohexane, benzene and hydrogen, at hydrogenation conditions in a plurality of reaction zones having disposed therein a hydrogenation catalyst comprising an alumina-containing refractory inorganic oxide combined with an alkali metal and platinum, said hydrogen and cyclohexane passing in series flow from the first to the last of said reaction zones and said benzene passing in parallel flow into each of said reaction zones, the effluent from each of said reaction zones except the last being cooled to a temperature of about 200° F. to about 800° F., removing cyclohexane, substantiallyy free from benzene, from the last of said plurality of reaction zones and passing at least a portion of said cyclohexane to the inlet of the first of said reaction zones, whereby the same passes in series flow therethrough.

The utilization of the present invention affords advantages to the processing of sulfur-contaminated benzene to form substantially pure cyclohexane, and involves contacting cyclohexane, water-saturated hydrogen and benzene, the latter containing sulfur in an amount of from about 0.1 p.p.m. to about 3.0 p.p.m. in a plurality of reaction zones having disposed therein a platinum-alumina catalyst composited with lithium in an amount of from about 0.01% to about 0.7% by weight, and maintained under an imposed pressure of about 300 to about 1000 pounds per square inch, the inlet temperature to each of said reaction zones being within the range of from about 300° F. to about 600° F.; said hydrogen and cyclohexane passing in series flow from the first to the last of said reaction zones, the hydrogen in an amount to yield a mol ratio of hydrogen to cyclohexane in the total effluent from the last of said reaction zones not substantially less than about 4:1; said benzene passing in parallel flow to each of said reaction zones, and in a total amount to yield a liquid hourly space velocity, based upon the total quantity of catalyst disposed in said plurality, of from about 1.0 to about 5.0; combining the total effluent from each of said reaction zones, except the last, with benzene and cooling the resultant mixture to a temperature within the aforesaid range prior to passing the same into the next succeeding reaction zone; removing cyclohexane, substantially free from benzene, and hydrogen from the last reaction zone in said plurality, separating said hydrogen to provide substantially pure cyclohexane and passing said cyclohexane to the inlet of said first reaction zone in a mol ratio of from about 0.5:1 to about 5:1, with respect to the total quantity of benzene passing in parallel flow to said reaction zones.

Briefly, the present invention involves the utilization of a plurality of reaction zones, the flow through which is partially in series and partially parallel. Although any suitable number of reaction zones may be employed, the use of three reaction zones is preferred. The use of two reaction zones does not appear to result in substantially complete conversion of the benzene to cyclohexane without the use of unnecessary high temperatures which result in the undesirable side reactions; the utilization of more than three reaction zones does not appear to yield additional benefits, over the use of three reaction zones in the preferred embodiment, and is, therefore, considered uneconomically feasible. To facilitate the operation, the total volume of catalyst employed in the process is divided into approximately equal portions, each of which is disposed within one of the three reaction zones. Similarly, the total benzene should be added in three approximately equal portions, one each of said portions to the inlet of each of the three reaction zones. Thus, the benzene passes in parallel flow through the reaction zones, while the hydrogen and cyclohexane recycle passes in series through the reaction zone. The temperature rise in each reaction zone is limited thereby to an allowable value, at the pressure imposed thereon, by restricting the quantity of benzene in the reactant mixture introduced to a particular zone. Recycled cyclohexane is employed to increase the ratio of hydrogen to benzene in the reactant mixture, and hence to increase the hydrogen allowable in a single reaction zone. The use of a plurality of reaction zones in series reduces the quantity of recycle cyclohexane required, and also reduces the total quantity of excess hydrogen needed. Approximately one-third of the total benzene charge is commingled with the recycled cyclohexane and hydrogen, and is charged to the first reaction zone. Prior to entering the reaction zone, the mixture is heated to a temperature of about 400° F. The quantity of cyclohexane is approximately equal to three times the quantity of benzene charged to the first reaction zone; the hydrogen is employed in an amount sufficient to yield a mol ratio of hydrogen to cyclohexane, in the effluent from the last reaction zone in the series, not substantially less than about 4:1. The total effluent leaves the first reaction zone at a temperature of about 500° F., and although a temperature profile has indicated peak temperatures as high as 600° F. to 700° F., the utilization of the catalyst of the present invention has been found to result in little or no hydrocracking whereby undesirable straight-chain paraffinic hydrocarbons are formed. The effluent from the first reaction zone is commingled with a portion of benzene equal to approximately one-third of the total benzene charge to the process. The resulting mixture is then cooled to a temperature of about 400° F., prior to entering the second reaction zone. Similarly, the effluent from the second reaction zone is commingled with approximately one-third of the total benzene charge and is subsequently cooled to a temperature of about 400° F. prior to entering the third reaction zone. The total effluent from the last reaction zone is passed into a high pressure separator, maintained at a temperature of about 100° F. or less, wherein it is divided into two phases. A hydrogen-rich gas phase is recovered, and is subsequently recirculated to the first reaction zone as a portion of the hydrogen necessary for the reaction; at least a portion of the liquid phase, being substantially pure cyclohexane, is recycled to the inlet of the first reaction zone. The remaining portion of the cyclohexane stream is passed to a stabilizer for the purpose of removing hydrogen therefrom, which hydrogen may have been adsorbed by the cyclohexane in the high-pressure separator. The process of the present invention, when effected in accordance with the conditions stated herein, is capable of producing a cyclohexane stream of greater than 99.5% purity for an extended period of time, and without the need for frequent, expensive shutdowns necessitated by a deactivated catalyst. It is not unusual for the process of the present invention to result in a cyclohexane product of as high as 99.85% purity, or higher.

The process of the present invention, for hydrogenating aromatic hydrocarbons to the corresponding cyclic paraffins and particularly the process for hydrogenating benzene to yield substantially pure cyclohexane, is more clearly described with reference to the accompanying drawing. Our invention is not limited to the particular embodiment illustrated: miscellaneous valves, coolers, heaters, instrumentation piping, etc. have been eliminated from the illustration as not being completely essential to the understanding of the process flow described therein. It is understood that the utilization of such miscellaneous appurtenances are within the knowledge of one skilled in the art of catalytic processing, and are not limiting, therefore, upon the process of the present invention. Similarly, various simplified modifications of the illustrated flow may be made without removing the same from the broad scope and intended spirit of the appended claims. The illustration is given for the sole purpose of indicating a preferred mode of operation, and one which yields the desired end result.

The aromatic hydrocarbon, in the present illustration benzene, is passed from a suitable benzene storage facility 1 through line 2, being admixed with recycled hydrogen and cyclohexane in line 3 prior to being introduced into heater 4. The cyclohexane is present in an amount to yield a mol ratio, with respect to the total quantity of benzene passing in parallel flow to reactors 6, 12 and 18, within the range of about 0.5:1 to about 5:1. The source of the hydrogen and cyclohexane in line 3 is hereinafter described. The reaction of benzene to cyclohexane is exothermic and, once initiated at elevated temperature, is self-sustaining: heater 4 is, therefore, employed to increase the temperature of the benzene-cyclohexane-hydrogen mixture to the level desired at the inlet to the first of the series of reaction zones, reactor 6. The heated charge passes from heater 4 through line 5 into reactor 6. Reactor 6 is maintained under an imposed pressure within the range of about 100 to about 2000 pounds per square inch, and preferably at lower limits of the stated range, about 300 to about 1000 p.s.i., since an increase in pressure not only favors hydrogenation, but also tends to increase the degree of hydrocracking with attendant coke formation. The effluent from reactor 6 passes through line 7, is combined with fresh benzene charge in line 8, which benzene is approximately equal to the amount initially introduced to reactor 6, the mixture passing through line 9 into cooler 10. As hereinbefore stated, the hydrogenation reaction is exothermic, and therefore, the charge to the second reactor in the series, reactor 12, must necessarily be cooled to the desired inlet temperature prior to being contacted with the catalyst disposed in the next succeeding zone, reactor 12. The cooled mixture is passed through line 11 into reactor 12, and removed from the latter through line 13. The total effluent is again admixed with a quantity of fresh benzene approximately equal to that initially introduced to reactor 6, and the mixture is passed through line 15, cooler 16, and line 17 into the third reactor in the series, reactor 18.

As indicated in the drawing, coolers 10 and 16 are integral segments of a main intercooler 25. The illustrated flow of the intercooler system is employed to facilitate the necessary control of the inlet temperatures to reactors 12 and 18. The miscellaneous flow control valves are not indicated in the drawing, since these, as well as other intercooler systems would be obvious to one possessing sufficient knowledge of the utilization of these temperature controlling methods. Suffice to say that a suitable heat exchange medium, such as water, passes from intercooler 25 through a common line 26 and is distributed, in accordance with temperature controlling restrictions, through line 29 into cooler 10, and through line 27 into cooler 16. The cooling medium is then redirected to intercooler 25 through lines 28 and 30 respectively.

The product effluent from reactor 18 is removed through line 19 and introduced into a high-pressure separator 20. Separator 20 is operated at a pressure level slightly below that of reactor 18, which in turn is at a pressure slightly below that of reactor 12. The slight pressure drop through the reactor system, including separator 20, is an inherent result of the flow therethrough. In all cases, however, the reactor system will operate at a preferred pressure in the range of about 300 to about 1000 pounds per square inch, and preferably at the lower limits thereof. Separator 20 is operated at approximately room temperature, or below, in order to provide an equilibrium, low-temperature flash chamber whereby normally gaseous components may be removed through line 22, and the liquid product effluent removed through line 21. At least a portion of the liquid product in line 21 is recycled to combine with fresh benzene charge in line 2, through line 3. Prior to being comingled with benzene in line 2, the cyclohexane liquid product is admixed with compressed recycle hydrogen in line 52; the source of the latter is hereinafter described in greater detail. The hydrogen introduced into the system via line 52, is of an amount to maintain a mol rotio of hydrogen to $C_6$-hydrocarbons, in the effluent from reactor 18, in excess of about 4:1.

The remainder of the cyclohexane liquid product is introduced via line 53 into stabilizer 54. Stabilizer 54 is operated at conditions to enable the withdrawal of substantially pure cyclohexane from the bottom portion thereof, through line 55. When present, light paraffinic hydrocarbons, including pentanes, butanes and propane, and adsorbed hydrogen are removed from the upper portion of stabilizer 54 through line 56, and are introduced into receiver 57 for the purpose of providing a light hydrocarbon reflux through line 58 into stabilizer 54. The excess light hydrocarbons are removed from receiver 57 through line 59, and may be stored for future use, withdrawn for use as fuel, or vented to the atmosphere. The adsorbed hydrogen and the lighter paraffins, consisting of methane and ethane are removed from receiver 57 through line 60, and may either be vented to the atmosphere, or subsequently employed as fuel.

The normally gaseous material entering high pressure separator 20 is removed through line 22 and line 32 into caustic wash column 45. In order to control the quantity of methane and ethane being maintained within the system and continuously recycled, line 22 is provided with vent line 23 containing a pressure control valve 24. The overall operation of the hydrogenation process of the present invention is facilitated by venting a sufficient quantity of gas through line 23 to maintain the concentration of methane and ethane within the recycle gas, at the level at which these substances are introduced to the process, thereby preventing an abnormal build-up of these gaseous constituents. Control valve 24 also serves to control the pressure on the reaction zones at the desired level.

Since the hydrogenation of aromatic hydrocarbons, to the corresponding cyclic paraffins, involves the consumption of three mols of hydrogen per mol of aromatic hydrocarbon, make-up hydrogen is introduced to the system from any suitable source thereof. Catalytic reforming processes produce substantially large quantities of a highly concentrated, hydrogen-rich gas stream, and thus, is one of the more suitable sources of make-up hydrogen for use in the instant process; the hydrogen concentration thereof often being in excess of about 80% by volume. This hydrogen-rich stream is introduced to the instant process by line 33 into amine scrubber 34. The amine scrubber is employed for the purpose of removing hydrogen sulfide and at least a portion of the light paraffinic hydrocarbons, contaminating the incoming make-up hydrogen in line 33. Any suitable liquid adsorbent may be employed in amine scrubber 34. Diethanolamine is a preferred liquid adsorbent from the standpoint of its ability to remove the hydrogen sulfide, and the relative ease with which the adsorbed gases may be subsequently removed therefrom to permit the regeneration thereof. The hydrogen sulfide-containing diethanolamine is removed through line 36 to a suitable amine recovery system. The "clean" amine is subsequently returned to the upper portion of amine scrubber 34 through line 35.

The scrubbed hydrogen stream, substantially reduced in hydrogen sulfide concentration, enters the bottom portion of a lean oil absorber 38, via line 37. At approximately midway in lean oil absorber 38 there is a centerwell 61 below which lean oil, being a suitable hydrocarbon fraction boiling within the range of about 300° F. to about 500° F., enters the absorber via line 39. In the bottom portion of absorber 38, that is, the section below centerwell 61, the hydrogen stream is countercurrently contacted by the lean oil entering through line 39, and the latter absorbs light paraffinic hydrocarbons from the hydrogen stream, leaving the absorber via line 40 and entering the upper portion of lean oil stripper 43. The lean oil stripper is operated such that the hydrocarbon oil, containing light paraffinic hydrocarbons, is effectively distilled as it passes downward through the column. The bottoms product leaving through line 39, being substantially free from the light paraffinic hydrocarbons (methane, ethane and propane) which are removed from the top of the column through line 44, is passed to absorber 38, being introduced just below centerwell 61. Above centerwell 61, a stream of benzene is employed to strip any of the heavy hydrocarbon fraction, employed as the lean-oil absorbent, which might be entrained by the hydrogen passing upward through absorber 38. The benzene is introduced via line 41, and the benzene plus absorbed lean oil is removed via line 42. The lean oil-containing benzene may be sent to a lean oil recovery unit from which the benzene may be in turn subjected to benzene recovery, and the lean oil returned to the system via line 39. The hydrogen stream leaving absorber 38 via line 31, being substantially free from hydrogen sulfide and the light paraffinic hydrocarbons, is combined with the high pressure separator off gas in line 22, the resulting mixture entering the bottom of caustic wash column 45 via line 32. The caustic wash column contains a centerwell 62, below which sodium hydroxide, or other suitable alkaline material, enters through line 46 for the purpose of further removing any residual hydrogen sulfide, light paraffinic hydrocarbons, diethanolamine, etc. It should be noted that the hydrogen-rich gas stream from high-pressure separator 20, in line 22, is a portion of the total gas stream being introduced to caustic wash column 45. As hereinbefore stated, the utilization of the platinum-containing catalyst permits the use of elevated temperatures in reaction zones 6, 12 and 18, whereby hydrogen sulfide is produced by the reversibility of the following chemical reaction:

$$Pt + H_2S \rightleftharpoons PtS_x + H_2 \qquad (2)$$

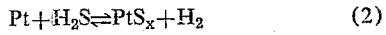

This hydrogen sulfide, in addition to hydrogen, forms the greater portion of the gaseous phase leaving separator 20. The removal of the hydrogen sulfide from this gas phase, in caustic wash column 45, constitutes an important feature of our invention, whereby the hydrogenation reaction may be effected in the presence of only that hydrogen sulfide resulting from the sulfurous compounds entering the process from benzene storage 1 via lines 2, 2 and 14. As the caustic becomes "spent," and incapable of effectively washing the hydrogen-rich gas stream, it may be removed from the system via line 47. Above centerwell 62, caustic wash column 45 is provided with water inlet 48 and water outlet 49; the water serves to remove entrained sodium hydroxide or other caustic material from the hydrogen passing upwardly through centerwell 62. The resulting water-saturated, hydrogen stream is removed from column 45 via line 50 to the suction side of compressor 31. Compressor 51 discharges, at a pressure of 100 to 2000 p.s.i. and a temperature of about 100° F. or less, via line 52, into the cyclohexane-recycle line 3 and is ultimately combined with fresh benzene in line 2 prior to being heated to the desired inlet temperature of reaction zone 6. The hydrogen to hydrocarbon mol ratio is calculated on the basis of the quantity of $C_6$ hydrocarbons in the product effluent from reactor 18; that is, the hydrogen is recycled via compressor 51 at a rate to yield a mol ratio not substantially less than four mols of hydrogen to one mol of $C_6$-hydrocarbons in the product from reactor 18. The excessive quantity of hydrogen assures an adequate supply of hydrogen to effect the hydrogenation of the benzene, facilitates the control of the inlet temperature to reactor 6, and inhibits, or significantly reduces, the tendency for coke and other carbonaceous material to be formed in the reaction zones.

Since all of the hydrogen-rich gas stream, passing through the plurality of reaction zones in series flow, being a mixture of makeup hydrogen from a suitable outside source and excess hydrogen from the high-pressure separator, is subjected to a caustic-washing treatment (to remove substantially all of the hydrogen sulfide therefrom) followed by a water-washing treatment (to remove entrained caustic), the hydrogen is necessarily saturated with water as it leaves the caustic-wash column. Through the utilization of the catalyst and process flow of the present invention, at the operating conditions stated herein, there is no need to remove the water from the hydrogen-rich gas stream. Thus, with reference again to the accompanying drawing, the water-saturated, hydrogen-rich gas stream leaving caustic wash column 45 via line 50, passes directly through compressor 51 into line 52. Without interruption, this water-saturated gas stream combines with recycle cyclohexane in line 3 and is transmitted directly through heater 4 after being combined with fresh benzene charge in line 2. Compressor 51 normally operates at a temperature within the range of about 60° F. to a level not substantially in excess of 100° F. Compressor 51 is further operated to discharge at a pressure slightly above the operating pressure maintained on reaction zones 6, 12 and 18. This slightly increased pressure takes into account the inherent pressure drop through the plurality of reaction zones, the high pressure separator, and the caustic wash column. At these conditions, the hydrogen-rich gas stream entering the reaction zones in series flow, may be water-saturated to a level of as great as about 0.2 mol percent. In addition to the water entering the plurality of reaction zones as a result of the subjection of the hydrogen to a caustic washing treatment (followed by water washing to remove entrained caustic), a significant quantity of water is often encountered in the aromatic hydrocarbon stream being charged. Therefore, the total quantity of water present during the hydrogenation to produce the cyclic paraffin, may range as high as 1.0 mol percent, based upon the total quantity of aromatic hydrocarbon. As hereinafter indicated, the process, and catalyst, of our invention appears to be unaffected by unusually large concentrations of sulfur when effected in the presence of water up to a level of about 1.0 mol percent. This rather unexpected result indicates the obvious economic advantage of providing a successful hydrogenation process without the necessity of removing those components (sulfur and water), which are generally considered to be effective deactivating agents of noble metal-containing catalysts.

As hereinabove set forth, hydrogen sulfide is substantially completely removed from the hydrogen recycle stream in order that the catalyst disposed in the various reaction zones is contacted only with that hydrogen sulfide resulting from the reaction of the sulfurous compound contaminating the fresh benzene charge. The hydrogenation of benzene to cyclohexane is, therefore, effected in the presence of less than about 3.0 p.p.m. of sulfur, calculated as the element thereof. At the stated operating conditions, and in the presence of the water-saturated hydrogen gas stream, the noble metal-containing catalyst of the present invention is sulfur tolerant; the catalyst of the present invention will not, therefore, rapidly deactivate as a direct result of sulfur within the range of about 0.1 p.p.m. to about 3.0 p.p.m.

The process of the present invention makes use of a refractory inorganic oxide carrier material with which is composited a noble metal component and an alkali metal and/or alkaline-earth metal component. It is understood that the noble metal and/or other metal component may be present either as the element, or as a chemical compound, or in physical association with the other catalytic components. The noble metal may be present as such, or as a chemical compound or in physical association with the refractory inorganic oxide, or with the alkali metal, for example, or in combination with both. Similarly, the alkali metal may be present as such, or as a chemical compound, or in physical association with the refractory inorganic oxide, the noble metal or in combination with both. Under certain processing conditions peculiar to the hydrogenation of a particular aromatic compound, or of a particular mixture of aromatic compounds, the catalyst of the present invention may contain halogen. When employed, the halogen, selected from the group of fluorine and chlorine, is thought to be present in a particular chemical combination with the refractory inorganic oxide, the platinum, and/or the alkali metal. The noble metal component may be platinum, palladium, ruthenium, rhodium, etc. It appears that the utilization of either platinum and/or palladium yields more advantageous results, and these noble metals are, therefore, preferred. In general, the platinum component will be utilized in a concentration of from about 0.01% to about 1.0% by weight of the final catalyst, calculated as the element thereof. The alkali metal and/or alkaline-earth metal component, such as cesium, lithium, rubidium, sodium, calcium, magnesium and/or strontium, will be employed in a concentration of not more than about 5.0% by weight of the catalyst; in order to achieve the proper balance between inhibiting the occurrence of side reactions, and imparting the desired degree of stability to the noble metal-containing catalyst, it is preferred to employ the alkali and alkaline-earth metals in significantly lower concentrations. Therefore, they will be present in a concentration within the range of from about 0.01% to about 0.7% by weight, calculated as the element thereof. The particularly preferred refractory inorganic oxide, for use as the carrier material for the catalytically active metallic components, comprises an alumina-containing material. The utilization of other refractory inorganic oxides, in conjunction with the alumina, is generally dependent upon the desire to impart thereto certain desired physical and/or chemical characteristics. Thus, minor quantities of silica, titania, zirconia, boria, etc. may be utilized in combination with the alumina without removing the resulting catalytic composites of the broad scope of the present invention.

The catalyst for use in our process may be prepared in any suitable manner, and, it is understood that the particular method of manufacture is neither essential to, nor limiting upon the present invention. In general, alumina will be prepared by reacting a suitable alkaline reagent, including ammonium hydroxide, ammonium carbonate, etc., with a salt of aluminum including aluminum chloride, aluminum sulfate, aluminum nitrate, etc. The substances are intimately admixed under conditions which form aluminum hydroxide which, upon subsequent heating and drying, will form alumina. In those instances where it is desired to incorporate one or more other refractory inorganic oxides with the alumina, the same may be accomplished through any suitable means including separate, successive or co-precipitation methods. Similarly, a halogen compound may be introduced into the catalyst, and either before or after the formation of the alumina; the halogen preferably is added in the form of an aqueous solution of the hydrogen halide, or as a volatile salt thereof, such as ammonium chloride and/or ammonium fluoride. The manufacturing procedure is facilitated when the halogen and other components are combined prior to the addition thereto of the noble metal component, such as platinum. The platinum component is composited in any suitable manner, and generally by way of an impregnating procedure wherein a water-soluble platinum compound is employed. Suitable platinum compounds include chloroplatinic acid, platinic chloride, platinous chloride, etc. The alkali metal, or alkaline-earth metal, component is added as an aqueous solution of a suitable salt thereof, and thus may comprise a chloride, sulfate, nitrate, etc. of lithium, sodium, calcium, rubidium, magnesium, strontium, and/or cesium. It is understood that the halogen, platinum, alkali metal and/or alkaline-earth metal component may be added to the aluminum hydroxide or alumina in any manner, and at any step of the catalyst preparation as desired. It is generally advisable to introduce the platinum at a later step of the catalyst preparation in order that this relatively expensive metallic component will not be lost due to subsequent processing in the washing and purification treatments.

After all of the catalytic components have been composited, the catalyst will generally be dried at a temperature within the range of about 100 to about 300° F., for a period of from about 2 to about 24 hours. Rapid drying is to be avoided since the sudden evolution of gas will cause the catalyst particles to rupture and otherwise become strained. Following the drying of the catalyst, it is subjected to a calcination treatment at a temperature of from about 800° F. to about 1100° F., for a period of from about 2 to about 12 hours, and in an atmosphere of air.

The hydrogenation reaction will be effected in a plurality of reaction zones maintained at an inlet temperature thereto within the range of about 200° F. to about 800° F. The inlet temperature to the reaction zones will generally be such that the outlet temperature does not exceed the range of about 400° F. to about 800° F. It should be noted that our process may be effected in reaction zones having internals designed such that little or no temperature increase takes place, and the outlet temperature will be effectively the same as the inlet temperature. To further facilitate the control of the hydrogenation reaction, we have found it beneficial to maintain the inlet temperature of the reaction zones at higher levels, but intermediate, within the range of about 300° F. to about 600° F. The utilization of higher temperatures, as hereinbefore set forth, has the added advantage of reversing the reaction whereby the platinum is effectively tied up through the formation of platinum sulfide, the resulting hydrogen sulfide being readily subsequently removed from the system. The utilization of cyclohexane recycle simplifies the control of the outlet temperature, as well as the "peak" temperature within the catalyst disposed within the reaction zone.

Although the reaction zones may be maintained under an imposed pressure within the range of about 100 pounds to about 2000 pounds per square inch, it is advantageous to utilize an intermediate pressure range, from about 300 pounds to about 1000 pounds per square inch. Higher pressures promote the hydrogenation of the aromatic nuclei, but likewise increase the degree of hydrocracking and ring-opening whereby low molecular weight, straight-chain paraffinic hydrocarbons are formed. The formation of such light hydrocarbons necessarily results in the decrease in liquid volumetric yield of cyclohexane. The utilization of the intermediate pressure, from about 300 to about 1000 pounds per square inch, when considered in conjunction with the various other limitations hereinbefore and hereinafter set forth, tends to increase the overall efficiency of the hydrogenation process in producing large volumetric yields of substantially pure cycloparaffinic hydrocarbons.

The liquid hourly space velocity, in regard to the fresh benzene charge, at which our process is operated, is within the range of about 1.0 to about 5.0. Liquid hourly space velocity is herein defined as the volumes of benzene charged per hour per volume of catalyst; the quantity of catalyst is considered as being disposed in a single reaction zone, the total benzene charge being passed therethrough. Substantially pure cyclohexane is recycled in an amount to yield a mol ratio of cyclohexane, passing to the inlet of the first reaction zone in the plurality of reaction zones, to the total fresh benzene charge which passes in parallel flow to said reaction zones, within the range of about 0.5:1 to about 5:1. As hereinbefore stated, through the utilization of the catalyst and operating conditions of the present invention, our process will produce large volumetric yields of cyclohexane of at least 99.5% purity, and will continue to do so over an extended period of time, thereby eliminating the need for a frequent shutdown due to a required change and/or regeneration of the catalyst. It is not unusual for the process of the present invention to constantly produce a cyclohexane stream of 99.85% purity.

The following example is given to illustrate further the novelty and utility of the present invention, and also to indicate the benefits to be afforded through the utilization thereof. It is not intended that the illustrative example be considered as limiting the present invention to the concentrations, reagents, and/or conditions employed therein. The catalyst employed within the example made use of a halogen-free alumina carrier material. The noble metal, platinum, was incorporated in an amount of 0.75% by weight, and lithium was added thereto in an amount of 0.274% by weight. The carrier material was prepared by the reaction of ammonium hydroxide with aluminum chloride to form aluminum hydroxide. Following formation into spherical particles, the alumina was dried, and calcined at an elevated temperature of about 900° F. The incorporation of the platinum and lithium involved the simultaneous impregnation of the resulting alumina spheres with a single aqueous impregnating solution of lithium hydroxide and chloroplatinic acid in amounts sufficient to yield the indicated quantities of the metals, 0.274% and 0.75% by weight respectively, calculated as the elements thereof. The impregnated spherical particles were then dried over a water bath at about 210° F., and subsequently calcined for a period of 5 hours at a temperature of about 1800° F., and in an atmosphere of air.

EXAMPLE

The operation herein described covers a total period of about 840 hours, and was conducted, in its entirety, utilizing a single reaction zone fabricated from type 316 stainless steel. The reaction zone internals were designed to permit a loading of the alumina-platinum-lithium catalyst which might vary, from operation to operation, in an amount from about 25 cc. to about 100 cc. The reactor was equipped with a centrally located thermocouple well, to facilitate temperature recording at the inlet, outlet and various intermediate points within the catalysts bed. Spiral inner-heaters were employed above the catalyst in order to obtain the even distribution of heat which was supplied over the entire length of the reactor by means of bronze block heaters insulated against the atmosphere.

The total effluent, from the reaction zone, was passed into a high-pressure separator maintained at essentially 55° F., from which the cyclohexane liquid product was withdrawn to a debutanizing column. The debutanizer removed any light paraffinic hydrocarbons which may have been introduced into the system along with make-up hydrogen from the outside source, and produced a substantially pure cyclohexane stream upon which analyses could be made, and which would approximate very closely the product which might be expected from a commercial size operation. The hydrogen make-up was obtained from standard high-pressure cylinders, and was combined with the hydrogen-rich off gas removed from the high-pressure product separator. The unit was supplied with absorbers for the purpose of removing hydrogen sulfide and water from the hydrogen-rich gas stream. The liquid charge to the reactor was a mixture of 25% by volume benzene and 75% by volume cyclohexane. The liquid charge was passed through a suitable drier, containing silica gel, and was combined with the hydrogen-sulfide free gas stream prior to entering the reaction zone. For the purposes of observing the effect of hydrogen sulfide and/or water upon the platinum-lithium catalyst, and upon the reaction promoted thereby, provisions were made whereby the scrubbers and driers could be by-passed. In this manner, thiophenic compounds, mercaptans, and compounds which formed water under the reaction zone conditions, could be added to the cyclohexane-benzene liquid charge in any desired, controlled quantities.

The conditions relevant to the hydrogenation being effected within the reaction zone were, a liquid hourly space velocity (defined as volumes of liquid charge per hour, per volume of catalyst disposed within the reaction zone) of 1.75, based upon fresh benzene charge only. Cyclohexane was admixed with the benzene in a molal amount of 3:1, thereby yielding an overall liquid hourly space velocity of 7.0. The catalyst was loaded in a bed of 35 cc., and maintained under an imposed hydrogen pressure of 400 pounds per square inch; hydrogen, being a mixture of make-up hydrogen and hydrogen-rich off-gas from the high-pressure product separator, was circulated by a compressor in an amount of about 9.5 s.c.f/hr., or at a hydrogen to hydrocarbon mol ration of 5:1, based upon the total liquid feed to the reactor. The benzene-cyclohexane charge was maintained at about 245 cc./hr., and a vent gas stream was constanty removed, via a pressure control valve, to control and inhibit the build up of nitrogen, carbon dioxide and light paraffinic hydrocarbons which may have been present within the make-up hydrogen stream. The vent gas averaged slightly more than 0.5 s.c.f/hr. over the entire period of the operation. Unless otherwise hereinafter stated, the foregoing conditions were maintained at the indicated levels throughout the entire period of operation.

During virtually all of the operation, the recycle gas, inclusive of fresh make-up hydrogen, was passed through a high-surface sodium bed, under pressure, in order to remove hydrogen sulfide, and to maintain a comparatively dry recycle gas system. In those portions of the operation where it was desirable to either simulate a "wet," or water-saturated, condition, characteristic of the caustic-wash column employed commercially, or to approximate the effect of a water-saturated fresh benzene charge, characteristic of the indicated commercial benzene-cyclohexane feed ratio, a water-saturator was employed downstream of the high-surface sodium bed. The temperature of the water-saturator was varied in order to achieve a designated water input to the reaction zone; the saturator operated at full reaction zone pressure on the total recycle system.

Perhaps the most pertinent period of operation, from the standpoint of illustrating the benefits afforded through the utilization of the process of the present invention, is that portion effected from 508 to 557 hours of on-stream time. This portion of the operation was effected with 1.9 p.p.m. (by weight) of total sulfur in the benzene portion of the feed. Other conditions of operation were maintained at the levels previously indicated herein; the inlet temperature to the catalyst was maintained at 225° C. (437° F.) by controlling the bronze block heater at a temperature sufficient to yield this catalyst inlet temperature. The outlet temperature was virtually constant at 258° C. (496° F.), and the "peak" catalyst temperature was found to be 320° C. (608° F.)

The benzene charge was an extraction-grade benzene having a freeze point of 5.46° C., indicating a benzene purity of 99.89 mol percent. The sulfur content of the benzene charge, as determined by the nickel reduction method, was 0.9 p.p.m. The thiophene content was determined as 0.3 p.p.m.; sulfur was added, as tertiary butyl mercaptan and thiophene sulfur, to raise the total sulfur level to 1.9 p.p.m. The water content of the benzene was 0.2 mol percent, a value characteristic of saturation at 70° F. By operating the water-saturator at 50° F., the total water content of the reactor feed was increased to a level of 0.27 mol percent based on the total benzene-cyclohexane charge to the reactor. This value is slightly in excess of the 0.20 mol percent which might be expected as a result of the utilization of the caustic-wash column as hereinbefore described. This increased water content is not thought to affect the reliability of the data obtained; on the contrary, it illustrates the unexpectedness of the extremely beneficial results obtained through the use of our process. Generally, water in amounts even as high as 0.05 mol percent is considered as a hydrocracking promoter. As such, its inclusion in the reaction zone atmosphere would appear, or be assumed, to effect the highly undesirable hydro-cracking and ring-opening reactions, whereby the object of this invention, to produce large volumetric yields of substantially pure cyclohexane, would be very effectively defeated.

The results obtained during the foregoing period of operation, 508 to 557 hours, are indicated in the following Table I. The results are given for both the total product effluent, minus, of course, the hydrogen-rich off-gas, and for the debutanized product effluent. Debutanization was effected for the purpose of rejecting approximately 0.3 volume percent butane which was present as a result of charge stock contamination in pressure tanks; the butanes were not produced, as such, within the process. The indicated trace quantity of pentane was probably from the same source, as other product analyses failed to show pentanes in the liquid product effluent.

*Table I*

PRODUCT COMPOSITION [1]

|  | As-produced | Debutanized |
|---|---|---|
| Benzene Content, wt. percent [2] | 0.022 | 0.021 |
| Hydrocarbon Composition, vol. percent: [3] |  |  |
| Isobutane | 0.003 |  |
| Normal Butane | 0.307 | 0.007 |
| Isopentane | 0.002 |  |
| Normal Pentane | 0.007 |  |
| Normal Hexane | 0.045 | 0.046 |
| Methylcyclopentane | 0.016 | 0.016 |
| Cyclohexane + Benzene | 99.962 | 99.931 |
| Total | 100.0 | 100.0 |
| Freeze Point, °C | 5.57 | 6.15 |
| Cyclohexane Purity, vol. percent: |  |  |
| By Analysis | 99.60 | 99.91 |
| By freeze Point Determination | 99.59 | 99.83 |

[1] Sample taken during the period of operation between 518 to 557 hours on stream.
[2] As determined by Ultra-Violet analysis.
[3] As determined by Gas-Liquid Chromatography.

At the outset of the operation (0 to 32 hours), the unit was operated with 1.9 p.p.m. total sulfur in the benzene charge at an inlet temperature of about 302° F. A very rapid deactivation rate was observed over this period, as indicated by a constantly decreasing "peak" catalyst temperature and a steadily increasing concentration of benzene in the liquid product effluent. Taken together, these items indicate a loss in catalytic activity and selectivity for effecting the hydrogenation of benzene to cyclohexane. During the period of 32 to 80 hours, with the continued use of 1.9 p.p.m. of total sulfur, the inlet catalyst temperature was increased to about 352° F. The benzene concentration in the liquid product effluent appeared to line out at a level of 0.02 mol percent, and the "peak" catalyst temperature remained effectively constant at about 621° F. This indicates a cessation of the rapid catalyst activity decline which was observed during the initial 32 hours of operation. From 80 to 175 hours, the sulfur content was decreased to a level of 1.2 p.p.m., and water was present in an amount of 0.02 mol percent. The inlet catalyst temperature was increased to a level of about 392° F., during this period. Unexpectedly, however, the "peak" catalyst temperature remained constant at about 613° F., not substantially changing from the previous level. The benzene content of the liquid product effluent, as determined by Ultra-Violet analysis, appeared to line out at the comparatively low level of 0.0002 mol percent (2.0 p.p.m.). During the period of 175 to 208 hours, the sulfur concentration was increased to 1.6 p.p.m., the water to a level of 0.04 mol percent, and the inlet catalyst temperature was raised to about 410° F. The overall effect of this change in conditions was virtually nil; the "peak" catalyst temperature remained at 613° F., and the benzene content of the liquid product was continually within the range of 0.0002 (2.0 p.p.m.) to 0.0004 mol percent (4.0 p.p.m.). Up to this point in the operation, the hydrogen sulfide was constantly being removed from the hydrogen-rich recycle gas stream. A demonstration of the effect of removing the recycle gas scrubber was obtained during the period of operation from about 207 to 302 hours. During this period, the sulfur concentration was again increased to a level of 1.9 p.p.m. This was accomplished through the addition to the benzene-cyclohexane charge, of both thiophenic sulfur and tertiary butyl mercaptan. A slow, but continued deactivation appeared to be the net result, as indicated by the following: at 205 hours, the benzene content of the product effluent was 0.0004 mol percent; at 220 hours, the benzene concentration had increased to a level of 0.0006 mol percent; at 225 hours, the benzene concentration was 0.0009 mol percent; a benzene concentration of 0.0019 mol percent was observed at 252 hours; at about 277 hours of operation, the benzene concentration had increased to a level of 0.0039 mol percent; at 292 hours and 296 hours respectively, the benzene concentration had been increased to a level of 0.016 and 0.025 mol percent. A special two hour sample taken between 300 and 302 hours of operation, indicated a benzene concentration in the liquid product effluent of 0.031 mol percent. A reintroduction of the recycle gas scrubber, at 302 hours on stream, resulted in a reversal of this deactivation trend. It should be noted that the total sulfur content of the benzene-cyclohexane charge was maintained at the high level of 1.9 p.p.m. At 317 hours, the benzene concentration of the liquid product effluent had already decreased to a level of 0.0012 mol percent. At 366 hours and 386 hours, the benzene concentration in the product effluent had returned to the more reasonable level of 0.0010 mol percent (10 p.p.m.) and 0.0007 mol percent (7 p.p.m.) respectively.

During the period of 391 to 458 hours, the inlet catalyst temperature was decreased to a level of 320° F. At the same time, the water concentration was increased to a level of about 0.95 mol percent, while the sulfur concentration was maintained at 1.9 p.p.m. The almost immediate result was a decrease in the "peak" catalyst bed temperature to a level of about 572° F. Of greater significance was the fact that the benzene concentration in the cyclohexane product increased to a level of 0.13 mol percent (1300 p.p.m.). This value is significantly in excess of that which can be tolerated by present day processes utilizing substantially pure cycloparaffinic hydrocarbons, and especially substantially pure cyclohexane. From 458 hours to 508 hours of on-stream operation, the catalyst inlet temperature was increased to a level of 437° F., and was accompanied by an increase in the "peak" catalyst temperature to a level of about 612° F. It is significant that during this period of operation, the sulfur level was maintained at 1.9 p.p.m. and the water concentration at the elevated level of 0.95 mol percent. These relatively large quantities of contaminants did not appear to effect the overall operation of the process, for the benzene concentration in the cyclohexane product virtually immediately decreased to a level of about 0.038 mol percent at 477 hours, and further decreased to a level of about 0.030 at 508 hours. The operating conditions, and the results of the analyses performed upon the liquid product effluent, during the period of operation from 508 hours to 557 hours have been previously set forth, and indicated in Table I.

During the period of operation encompassed by 557 hours to 622 hours, the process was operated utilizing a substantially dry liquid charge as well as a substantially dry recycle hydrogen stream. A slow but steady increase in the benzene concentration in the cyclohexane product was observed; from the previous level of about 0.02 mol percent, the benzene concentration steadily increased to a level of about 0.16 mol percent at 622 hours. At this stage of the operation, the liquid charge was removed from the process, and the catalyst treated with a relatively dry hydrogen stream at an elevated temperature of 500° C. Following this hydrogen treatment, the process was placed back on stream, and five hours thereafter a sample of the cyclohexane product taken for benzene determination. The benzene concentration was found to be 0.005 mol percent. However, ten hours later a second sample of the cyclohexane product indicated a substantial increase in the benzene concentration to a level of 0.027 mol percent. This relatively high level, or increase in benzene concentration in the cyclohexane product was observed during the entire period to 675 hours of operation. At 675 hours, the sulfur concentration was decreased from 3.0 p.p.m. to 1.5 p.p.m. There was noticed an almost immediate decrease in the benzene concentration of the cyclohexane product to a level of about 0.008 mol percent. At 725 hours of operation, and at the same operation conditions, the benzene concentration was found to be 0.0079 mol percent. This apparently steady operation continued, at the elevated catalyst inlet temperature up to a period of 770 hours. At this stage of the operation, a decrease in the inlet catalyst temperature effected a corresponding decrease in the "peak" catalyst bed temperature accompanied by a substantial increase in the benzene concentration within the cyclohexane product. At 795 hours, the inlet catalyst temperature was increased to a level of about 591° F. with the result that the "peak" catalyst temperature increased to a level of 653° F. This was accompanied by a substantial decrease in the benzene concentration within the cyclohexane to a level of about 0.014 mol percent.

It should be noted that the latter period of operation, from 557 hours to 820 hours, was effected with a substantially dry system. The obvious effect, that of a substantial increase in the benzene concentration of the cyclohexane product, is immediately ascertained as the sulfur concentration is increased from 1.5 p.p.m. to a level of 3.0 p.p.m., and subsequently decreased to a level of 1.5 p.p.m. Operating with a relatively high sulfur concentration, and in the absence of the water-saturated recycle hydrogen, has indicated the necessity of catalyst regeneration, as illustrated by the hydrogen treatment. Of greater significance, is the fact that such catalyst regeneration appears to be a temporary expediency, and does not affect significantly the stability of the catalyst. It is apparent that the catalyst for utilization in the process of the present invention, may be sulfur tolerant as long as the operating conditions hereinbefore set forth are adhered to, and as long as the proper balance is struck between the sulfur concentration and the water content. To substantiate this, there is no noticeable increase in the benzene concentration during the next 20 hours of operation, or up to a period of 840 hours, during which time the water saturator was reintroduced into the system to yield a water-saturated hydrogen recycle gas stream.

The foregoing discussion is conveniently illustrated in the following Table II.

*Table II*

| Ref. Plant 508, Run 524 Hours | Sulfur, wt. p.p.m. | H₂O Mol Percent | Temperatures, ° C. | | | | Cyclohexane Product | |
|---|---|---|---|---|---|---|---|---|
| | | | Block | | | | Benzene Mol Percent | Freeze Point, ° C. |
| | | | Inlet | Peak | Outlet | | | |
| 135 | 1.2 | 0.02 | 165 | 207 | 324 | 216 | .0002 | 6.08 |
| 195 | 1.6 | 0.04 | 165 | 210 | 327 | 220 | .0004 | 6.01 |
| 385 | 1.9 | 0.06 | 165 | 208 | 327 | 223 | .0007 | 5.71 |
| 450 | 1.9 | 0.95 | 165 | 157 | 300 | 239 | 0.11 | |
| 500 | 1.9 | 0.95 | 200 | 222 | 321 | 259 | 0.034 | 5.74 |
| 545¹ | 1.9 | 0.27 | 200 | 225 | 320 | 256 | 0.022 | 5.57 |
| 620 | 3.0 | None | 200 | 228 | 324 | 264 | 0.16 | |
| H₂ TREATMENT AT 500° C. | | | | | | | | |
| 670 | 3.0 | None | 200 | 219 | 321 | 260 | ²0.031 | 5.85 |
| 765 | 1.5 | None | 200 | 221 | 321 | 260 | .0080 | 5.94 |
| 785 | 1.5 | None | 180 | 194 | 292 | 238 | 0.055 | |
| 820 | 1.5 | None | 220 | 255 | 345 | 279 | 0.014 | |
| 840 | 1.5 | 0.15 | 220 | 255 | 340 | 275 | 0.013 | |

¹ 518–557 hours—proposed commercial conditions.
² Steadily increasing benzene concentration.

In the interest of simplicity and clarity, the table has necessarily been abbreviated to illustrate only the more pertinent periods of operation, and the changes in operating conditions effected therein. It is significant that the entire 840 hours was conducted utilizing a single batch of catalyst in a continuous operation.

The foregoing example, and specification, clearly indicate the process of the present invention and the advantages to be afforded through the utilization thereof. The catalyst employed in the process of the present invention has been shown to be extremely active for an extended period of time at the operating conditions employed herein.

We claim as our invention:

1. A process for hydrogenating aromatic hydrocarbons containing sulfurous compounds in an amount of from about 0.1 p.p.m. to about 3.0 p.p.m., calculated as elemental sulfur, which comprises contacting said sulfur-containing aromatic hydrocarbons with water-saturated hydrogen in a plurality of reaction zones having disposed therein an alumina-platinum catalytic composite containing from about 0.01% to about 0.7% by weight of lithium and maintained under an imposed pressure within the range of from about 100 to about 2000 pounds per square inch, the inlet temperature to each of said reaction zones being about 200° F. to about 800° F., removing a hydrogenated liquid product from the last reaction zone in said plurality and recycling at least a portion of said hydrogenated liquid product to the first reaction zone in said plurality.

2. A process for the production of a cycloparaffinic hydrocarbon from an aromatic hydrocarbon containing sulfurous compounds in an amount of from about 0.1 p.p.m. to about 3.0 p.p.m., calculated as elemental sulfur, which comprises hydrogenating said sulfur-containing aromatic hydrocarbon with water-saturated hydrogen in contact with a catalytic composite of a refractory inorganic oxide, a noble metal and at least one metallic component selected from the group consisting of alkali metals and alkaline earth metals at a temperature of from about 200° F. to about 800° F. and a pressure of from about 100 to about 2,000 pounds per square inch.

3. A process for the production of a cycloparaffinic hydrocarbon from an aromatic hydrocarbon containing sulfurous compounds in an amount of from about 0.1 p.p.m. to about 3.0 p.p.m., calculated as elemental sulfur, which comprises hydrogenating said sulfur-containing aromatic hydrocarbon with water-saturated hydrogen in contact with a catalytic composite of alumina, platinum and an alkali metal component at a temperature of from about 200° F. to about 800° F. and a pressure of from about 100 to about 2,000 pounds per square inch.

4. A process for the production of a cycloparaffinic hydrocarbon from an aromatic hydrocarbon containing sulfurous compounds in an amount of from about 0.1 p.p.m. to about 3.0 p.p.m., calculated as elemental sulfur, which comprises hydrogenating said sulfur-containing aromatic hydrocarbon with water-saturated hydrogen in contact with a catalytic composite of alumina, platinum and an alkaline earth metal component at a temperature of from about 200° F. to about 800° F. and a pressure of from about 100 to about 2,000 pounds per square inch.

5. A process for producing cyclic paraffins from aromatic hydrocarbons containing sulfurous compounds in an amount of from about 0.1 p.p.m. to about 3.0 p.p.m., calculated as elemental sulfur, which comprises contacting said sulfur-containing aromatic hydrocarbons and water-saturated hydrogen, at a temperature of from about 200° F. to about 800° F. and at a pressure of from about 100 to 2,000 pounds per square inch, in a plurality of reaction zones having disposed therein a noble metal catalyst composited with an alumina-containing refractory inorganic oxide, and at least one metallic component selected from the group consisting of alkali and alkaline-earth metal components, said hydrogen passing in series flow from the first to the last of said reaction zones and said aromatic hydrocarbons passing in parallel flow into each of said reaction zones, removing cyclic paraffins from the last of said plurality of reaction zones, and passing at least a portion of said cyclic paraffins, substantially free from aromatic hydrocarbons, to the inlet of the first of said reaction zones.

6. The method of claim 5 further characterized in that said cyclic paraffins comprise cyclohexane and said aromatic hydrocarbons comprise benzene.

7. A process for the production of cyclohexane from benzene containing sulfurous compounds in an amount of about 0.1 p.p.m. to about 3.0 p.p.m., calculated as elemental sulfur, which comprises contacting cyclohexane and said sulfur-containing benzene, in the presence of water-saturated hydrogen, in a plurality of reaction zones having disposed therein an alumina-platinum catalytic composite containing from about 0.01% to about 0.7% by weight of lithium and maintained under an imposed pressure within the range of from about 300 to about 1000 pounds per square inch, the inlet temperature to each of said reaction zones being about 300° F. to about 600° F., removing cyclohexane, substantially free from benzene, from the last reaction zone in said plurality, and recycling at least a portion of said cyclohexane to the first reaction zone in said plurality.

8. A process for producing substantially pure cyclohexane from benzene containing sulfurous compounds in an amount of from about 0.1 p.p.m. to about 3.0 p.p.m., calculated as elemental sulfur, which comprises contacting cyclohexane, said sulfur-containing benzene and water-saturated hydrogen, at a temperature of from about 200° F. to about 800° F. and at a pressure of from about 100 to 2,000 pounds per square inch in a plurality of reaction zones having disposed therein a hydrogenation catalyst comprising an alumina-containing refractory inorganic oxide combined with an alkali metal and platinum, said hydrogen and cyclohexane passing in series flow from the first to the last of said reaction zones and said benzene passing in parallel flow into each of said reaction zones, the effluent from each of said reaction zones except the last being cooled to a temperature of about 200° F. to about 800° F., removing cyclohexane, substantially free from benzene, from the last of said plurality of reaction zones and passing at least a portion of said cyclohexane to the inlet of the first of said reaction zones, whereby the same passes in series flow therethrough.

9. The process of claim 8 further characterized in that said hydrogenation catalyst comprises platinum and lithium composited with alumina.

10. The method of claim 9 further characterized in that the quantity of lithium is within the range of about 0.01% to about 0.7% by weight of the total catalyst and is calculated as the element thereof.

11. A process for producing cyclohexane from sulfur-contaminated benzene which comprises contacting cyclohexane, water-saturated hydrogen and benzene containing sulfur in an amount of about 0.1 p.p.m. to about 3.0 p.p.m. in a plurality of reaction zones having disposed therein a platinum catalyst composited with alumina and from about 0.01% to about 0.7% by weight of lithium, and maintained under an imposed pressure within the range of about 100 to about 2000 p.s.i., the inlet temperature to each of the reaction zones in said plurality being about 200° F. to about 800° F., said hydrogen and cyclohexane passing in series flow from the first to the last of said reaction zones and said benzene passing in parallel flow into each of said reaction zones, cooling the effluent from each of said reaction zones except the last to a temperature within the aforesaid range, removing cyclohexane and hydrogen from the last of the reaction zones in said plurality, separating said hydrogen to provide substantially pure cyclohexane and passing at least a portion of the latter to the inlet of the first of said reaction zones.

12. The process of claim 11 further characterized in that each of said reaction zones is maintained under an imposed pressure within the range of about 300 to about 1000 p.s.i.

13. The process of claim 11 further characterized in that the total quantity of benzene in parallel flow through said plurality of reaction zones is sufficient to yield a liquid hourly space velocity, based upon the total quantity of catalyst disposed in said reaction zones, of from about 1.0 to about 5.0.

14. The process of claim 11 further characterized in that the mol ratio of cyclohexane passing to the inlet of the first reaction zone in said plurality to the total benzene passing in parallel flow to said reaction zones is within the range of about 0.5:1 to about 5:1.

15. The process of claim 11 further characterized in that the water-saturated hydrogen passing to the inlet of the first reaction zone is sufficient to provide a mol ratio of hydrogen to cyclohexane in the effluent from the last of said reaction zones not substantially less than about 4:1.

16. A process for producing cyclohexane from sulfur-contaminated benzene which comprises contacting cyclohexane, water-saturated hydrogen and benzene containing sulfur in an amount of from about 0.1 p.p.m. to about 3.0 p.p.m. in a plurality of reaction zones having disposed therein a platinum-alumina catalyst composited with lithium in an amount of from about 0.01% to about 0.7% by weight, and maintained under an imposed pressure of about 300 to about 1000 pounds per square inch, the inlet temperature to each of said reaction zones being within the range of from about 300° F. to about 600° F.; said hydrogen and cyclohexane passing in series flow from the first to the last of said reaction zones, the hydrogen being in an amount to provide a mol ratio of hydrogen to cyclohexane in the total effluent from the last of said reaction zones not substantially less than about 4:1; said benzene passing in parallel flow to each of said reaction zones, and in a total amount to yield a liquid hourly space velocity, based upon the total quantity of catalyst disposed in said plurality, of from about 1.0 to about 5.0; combining the total effluent from each of said reaction zones, except the last, with benzene and cooling the resultant mixture to a temperature within the aforesaid range, prior to passing the same into the next succeeding reaction zone; removing cyclohexane, substantially free from benzene, and hydrogen from the last reaction zone in said plurality, separating said hydrogen to provide substantially pure cyclohexane and passing said cyclohexane to the inlet of said first reaction zone in mol ratio of from about 0.5:1 to about 5:1, with respect to the total quantity of benzene passing in parallel flow to said reaction zones.

References Cited in the file of this patent

UNITED STATES PATENTS

| | | |
|---|---|---|
| 2,171,009 | Rostin et al. | Aug. 29, 1939 |
| 2,303,075 | Frey | Nov. 24, 1942 |
| 2,776,934 | Weller | Jan. 8, 1957 |
| 2,901,423 | Herbert et al. | Aug. 25, 1959 |
| 2,929,854 | Wilson et al. | Mar. 22, 1960 |
| 2,971,901 | Halik et al. | Feb. 14, 1961 |